United States Patent [19]

Hall

[11] Patent Number: 5,408,211

[45] Date of Patent: Apr. 18, 1995

[54] TIMED VEHICLE DISABLING SYSTEM

[76] Inventor: Walter K. Hall, 28 Blue Point Rd., Selden, N.Y. 11784-3115

[21] Appl. No.: 172,910

[22] Filed: Dec. 27, 1993

[51] Int. Cl.⁶ .............................................. B60R 25/10
[52] U.S. Cl. .................................. 340/426; 340/425.5; 340/527; 340/309.15; 307/10.2; 307/10.3
[58] Field of Search ...................... 340/426, 425.5, 428, 340/429, 527, 529, 530, 430, 309.15, 309.5, 309.6; 307/10.2, 10.3, 10.6

[56] References Cited

U.S. PATENT DOCUMENTS

| | | | |
|---|---|---|---|
| 3,559,757 | 2/1971 | Weiss | 307/10.2 |
| 3,614,458 | 10/1971 | Stein | 307/10.3 |
| 4,485,887 | 12/1984 | Morano | 307/10.3 |
| 4,549,090 | 10/1985 | Read | 307/10.2 |
| 4,792,792 | 12/1988 | Costino | 340/426 |
| 5,304,979 | 4/1994 | Lima et al. | 307/10.3 |

Primary Examiner—Donnie L. Crosland

[57] ABSTRACT

A vehicle disabling system for connecting to a vehicle ignition system to disable the associated vehicle after a pre-determined length of time following an actuation of the system by a user. The device includes a disabling circuit which may be installed in series with the ignition system of the vehicle. The circuit includes a panic switch operable to actuate a timer and, after a pre-determined length of time has elapsed, subsequently actuate a relay. The relay is operable to then close a switch which results in a current surge through a fuse, thereby blowing the fuse and interrupting a supply of power to the vehicle ignition system. An alternate embodiment of the present invention includes a key-contained fuse holder for containing the fuse within the ignition key of the vehicle.

6 Claims, 3 Drawing Sheets

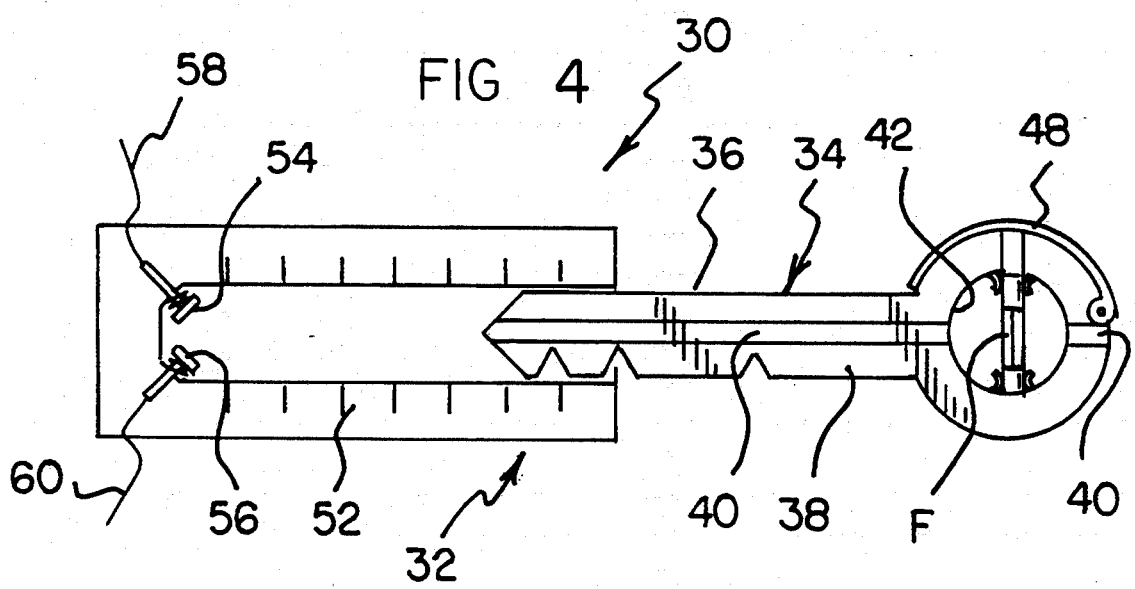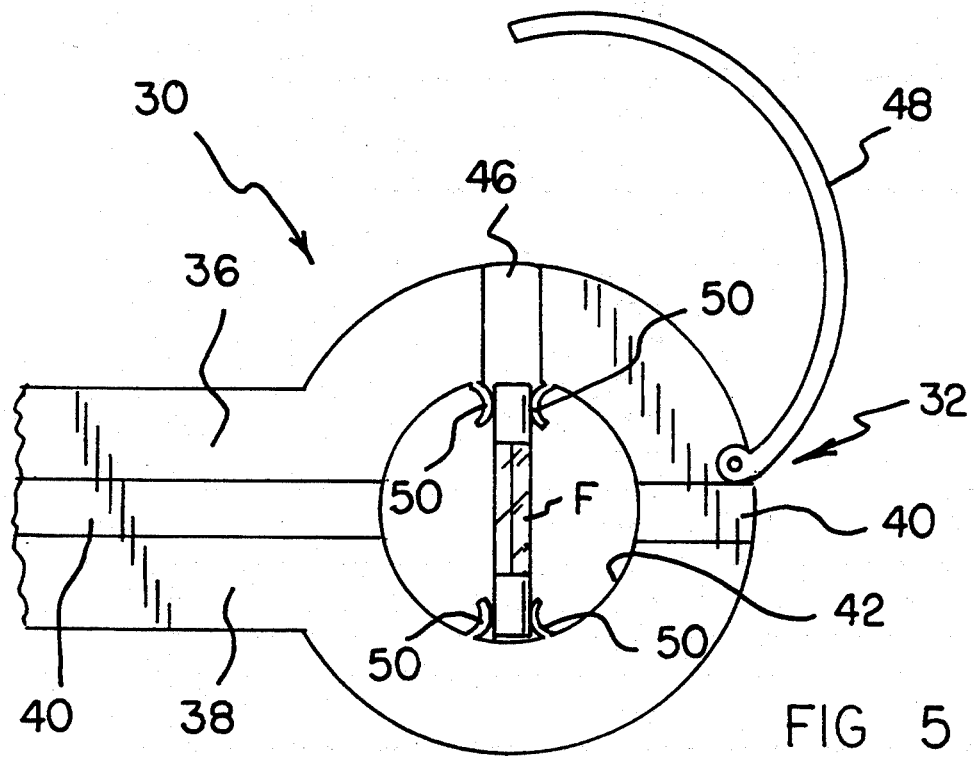

TIMED VEHICLE DISABLING SYSTEM

BACKGROUND OF THE INVENTION

1. Field of the Invention

The present invention relates to vehicle alarms and more particularly pertains to a vehicle disabling system for connecting to a vehicle ignition system to disable the associated vehicle after a pre-determined length of time.

2. Description of the Prior Art

The use of vehicle alarms is known in the prior art. More specifically, vehicle alarms heretofore devised and utilized for the purpose of disabling a vehicle are known to consist basically of familiar, expected and obvious structural configurations, notwithstanding the myriad of designs encompassed by the crowded prior art which have been developed for the fulfillment of countless objectives and requirements.

For example, an ignition disabling anti-theft device is illustrated in U.S. Pat. No. 4,992,670 in which circuit switching devices are used to disable the ignition system of a vehicle every time the vehicle engine is shut off. The ignition system can be enabled only by the application of battery voltage from a pre-existing vehicle electrical circuit through a secret switch.

An automotive alarm is described in U.S. Pat. No. 4,857,888 wherein an ignition cutoff and audible alarm is sounded after a predetermined delay. The alarm apparatus includes a plurality of switches comprising a pressure foot treadle switch and a bypass switch which is positioned discretely within the automobile's interior for actuation of the apparatus.

Another patent of interest is U.S. Pat. No. 5,041,810 which discloses an anti-theft device for an automobile such that when a door of the automobile is opened, a opened-door detection switch operates and a first control means stores in its memory the switch's action and cuts off an engine's start-up circuit. The engine can only be restatted when a registered password is entered into the device through a password inputing means.

While these devices fulfill their respective, particular objectives and requirements, the aforementioned patents do not disclose a vehicle disabling system for disabling an associated vehicle after a pre-determined length of time following an actuation of the system in which a timer actuates a relay that closes a switch to cause a current surge through a vehicle ignition system power supplying fuse, thereby blowing the fuse and interrupting a supply of power to the vehicle ignition system. Furthermore, none of the known prior art vehicle alarms teach or suggest a timed vehicle disabling system having the aforementioned features and further including a key-contained fuse holder for containing the fuse within the ignition key of vehicle.

In these respects, the timed vehicle disabling system according to the present invention substantially departs from the conventional concepts and designs of the prior art, and in so doing provides an apparatus primarily developed for the purpose of disabling an associated vehicle after a pre-determined length of time following an actuation of the system by a user.

SUMMARY OF THE INVENTION

In view of the foregoing disadvantages inherent in the known types of vehicle alarms now present in the prior art, the present invention provides a new timed vehicle disabling system construction wherein the same can be utilized for disabling an associated vehicle after a pre-determined length of time following an actuation of the system by a user. As such, the general purpose of the present invention, which will be described subsequently in greater detail, is to provide a new timed vehicle disabling system apparatus which has many of the advantages of the vehicle alarms mentioned heretofore and many novel features that result in a timed vehicle disabling system which is not anticipated, rendered obvious, suggested, or even implied by any of the prior art vehicle alarms, either alone or in any combination thereof.

To attain this, the present invention generally comprises a vehicle disabling system for connecting to a vehicle ignition system to disable the associated vehicle after a pre-determined length of time following an actuation of the system by a user. The device includes a disabling circuit which may be installed in series with the ignition system of the vehicle. The circuit includes a panic switch operable to actuate a timer and, after a pre-determined length of time has elapsed, subsequently actuate a relay. The relay is operable to then close a switch which results in a current surge through a fuse, thereby blowing the fuse and interrupting a supply of power to the vehicle ignition system. An alternate embodiment of the present invention includes a key-contained fuse holder for containing the fuse within the ignition key of the vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new timed vehicle disabling system apparatus which has many of the advantages of the vehicle alarms mentioned heretofore and many novel features that result in a timed vehicle disabling system which is not anticipated, rendered obvious, suggested, or even implied by any of the prior art vehicle alarms, either alone or in any combination thereof.

It is another object of the present invention to provide a new timed vehicle disabling system which may be easily and efficiently manufactured and marketed.

It is a further object of the present invention to provide a new timed vehicle disabling system which is of a durable and reliable construction.

An even further object of the present invention is to provide a new timed vehicle disabling system which is susceptible of a low cost of manufacture with regard to both materials and labor, and which accordingly is then susceptible of low prices of sale to the consuming public, thereby making such timed vehicle disabling systems economically available to the buying public.

Still yet another object of the present invention is to provide a new timed vehicle disabling system which provides in the apparatuses and methods of the prior art some of the advantages thereof, while simultaneously overcoming some of the disadvantages normally associated therewith.

Still another object of the present invention is to provide a new timed vehicle disabling system for connecting to a vehicle ignition system to disable the associated vehicle after a pre-determined length of time following an actuation of the system by a user.

Yet another object of the present invention is to provide a new timed vehicle disabling system which includes a disabling circuit that may be installed in series with the ignition system of the vehicle, and a panic switch operable to actuate a timer and a relay which, after a pre-determined length of time has elapsed, results in a current surge through a vehicle ignition system power supplying fuse, thereby blowing the fuse and interrupting a supply of power to the vehicle ignition system.

Even still another object of the present invention is to provide a new timed vehicle disabling system which may be easily connected to a vehicle fuse block, whereby the fuse forming a part of the vehicle's wiring and supplying power to the vehicle's ignition system may be selectively blown.

Even still yet another object of the present invention is to provide a new timed vehicle disabling system which further provides a key-contained fuse holder for containing a fuse within the ignition key of a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a side elevation view, partially in cross section, of a second embodiment of a timed vehicle disabling system comprising the present invention.

FIG. 5 is an enlarged side elevation view of portion of the second embodiment.

DESCRIPTION OF THE PREFERRED EMBODIMENT

Figure 2:
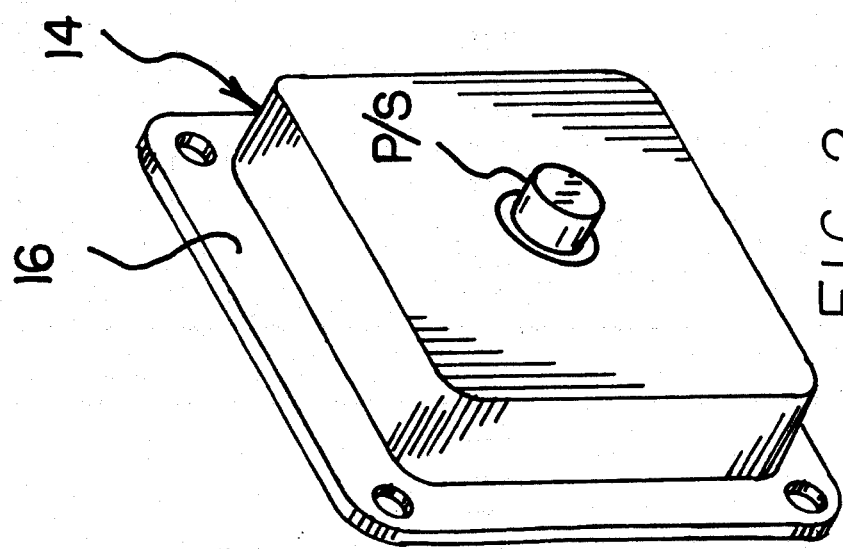
FIG. 2 is a perspective view of the present invention.
Figure 1:
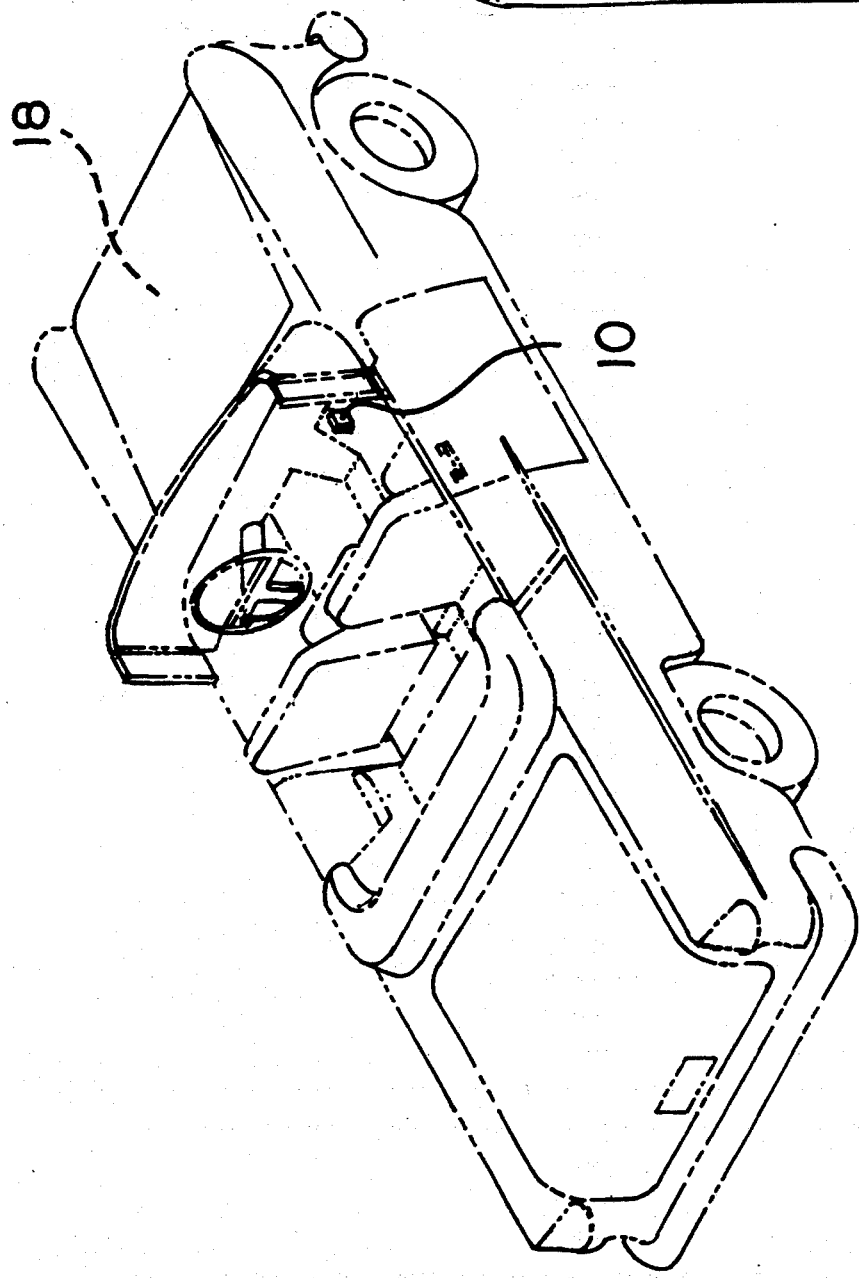
FIG. 1 is a perspective view of a vehicle having a timed vehicle disabling system installed therein.
Figure 3:
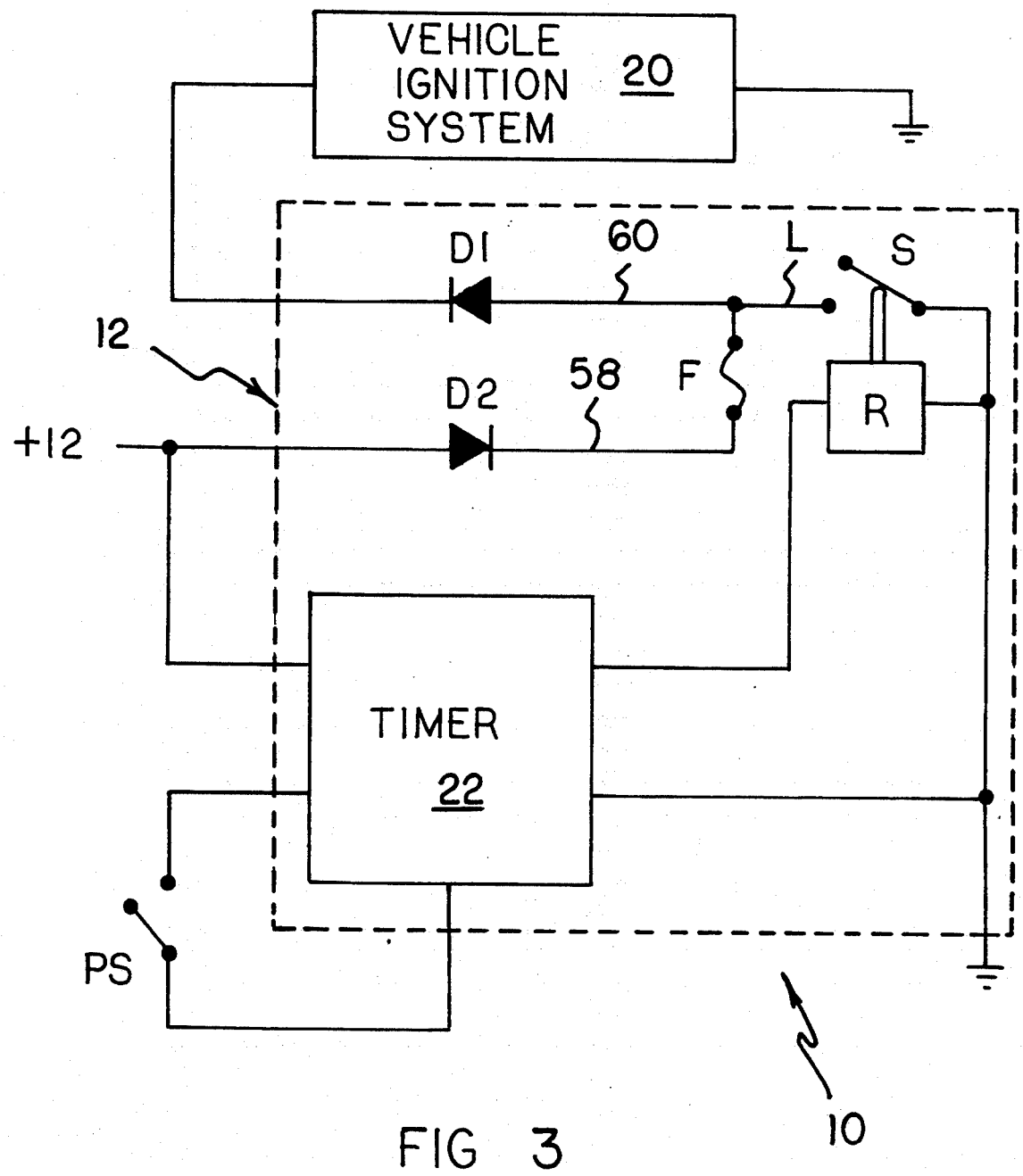
FIG. 3 is a diagrammatic circuitry illustration of the disabling circuit of the invention.

With reference now to the drawings, and in particular to FIGS. 1-3 thereof, a first embodiment of a new timed vehicle disabling system embodying the principles and concepts of the present invention and generally designated by the reference numeral 10 will be described.

From an overview standpoint, the timed vehicle disabling system 10 comprises a disabling circuit 12 which may be contained within a case 14, as best illustrated in FIGS. 2 and 3. The case 14 is provided with a mounting flange 16 which extends circumferentially therearound and provides a convenient means for attaching the system 10 to a vehicle 18. As illustrated in FIG. 1, the system 10 may be installed in various locations within the interior area of the vehicle 18, but is preferably mounted underneath the dashboard or on either side of the center console. The system 10 is provided with a panic switch PS which may be depressed by a user during an emergency situation, such as encountered during a car-jacking, vehicle attack, or the like, to actuate the disabling circuit 12 which will subsequently disable the ignition system 20 of the vehicle, thereby rendering the associated vehicle 18 immovable under its own locomotion. The panic switch PS may be mounted remotely from the system to better conceal the system 10. The system 10 may also be activated from outside the vehicle 18 by means of remote control wired in parallel with panic switch P.S.

In use, the timed vehicle disabling system 10 may be conveniently installed to a vehicle 18 and discretely mounted such that the panic switch PS is within the reach of the driver or the passengers from within the vehicle. Should a car-jacking or other similar vehicle theft occur, the user may simply actuate the system 10 by depressing the panic switch PS, whereby the vehicle will be disabled after a predetermined length of time.

More specifically, it will be noted that the timed vehicle disabling system 10 comprises a disabling circuit 12 which may be wired in series with the ignition system 20 of an associated vehicle 18. The disabling circuit 12 includes a timer 22 which may be easily connected to the unillustrated battery of the vehicle 18, as shown in the diagrammatic illustration of FIG. 3. A panic switch PS is electrically connected to the timer 22 such that an actuation of the panic switch will start a timing cycle of a pre-determined length of time. The pre-determined length of time may be any desired length of time, but preferably the timer 22 should be set for approximately 3 minutes.

After actuation of the timer 22 by the panic switch PS, and a subsequent elapse the pre-determined length of time, the timer 22 will actuate a relay R which closes a switch S. The closing of switch S grounds the positive lead of the vehicle ignition system 20 which creates a current surge through fuse F which results in the blowing of such fuse. As a result, electrical communication between the vehicle ignition system 20 and the vehicle's battery is interrupted resulting in a disabling of the associated vehicle 18.

Diodes D1 and D2 are positioned in series with the vehicle ignition system 20 to preclude a reverse flow of electrical power through the vehicle ignition system during the shorting of the fuse F. The diodes D1, D2, while intended to protect the vehicle ignition system 20 from a reverse flow of electricity, are not required to be included when the system 10 is installed into a vehicle 18 in which a reverse flow of electricity through the ignition system 20 would not be harmful. However, if such information is unknown the diodes D1, D2 should be included.

It is contemplated that the disabling circuit 12 may be easily connected to the factory installed fuse F typically present inline with the vehicle ignition system 20 of most vehicles 18. With this arrangement, lead L may simply be placed in contact with the side of the fuse F opposite the battery, with the diodes D1, D2 being permanently installed in series with the vehicle wiring, as shown in FIG. 3. Fuse F may alos be mounted remotely from system 10 to better conceal the system 10.

The disabling circuit 12 may be mounted and contained within a case 14 such as that shown in FIG. 2. The case 14 includes a mounting flange 16 extending circumferentially around a side of the case which provides a means for attaching the case in a well understood manner to a portion of the vehicle using threaded fasteners and the like. The panic switch PS may be positioned within the case 14 and mounted so as to extend through an unlabeled aperture proximate a center of the case, thereby to provide a conveniently accessible mounting position of the switch.

In use, the timed vehicle disabling system 10 may be conveniently installed to a vehicle 18 and discretely mounted such that the panic switch PS is within the reach of the driver or the passengers from within the vehicle. Should a car-jacking or other similar vehicle theft occur, the user may simply actuate the system 10 by depressing the panic switch PS, whereby the vehicle will be disabled after the predetermined length of time.

A second embodiment of the present invention, as generally designated by the reference numeral 30, which comprises substantially all of the features and structure of the foregoing embodiment 10 and which further comprises a key-contained fuse holder 32 will now be described. As best shown in FIGS. 4-5, it can be shown that the key-contained fuse holder 32 comprises a fuse-holding key 34 having a conducting first half 36 and a conducting second half 38 separated by an insulator 40 which extends longitudinally therebetween. The first and second halves 36, 38 are shaped so as to cooperatively define the fuse-holding key 34 having a center opening 42 within which the fuse F may be positioned.

FIG. 5 is an enlarged view of a portion of the fuse-holding key 34, and it can be seen from this Figure that the fuse F may be positioned within the center opening 42 through a bore 46 formed in the first half 36. A side cover 48 is pivotally mounted to the fuse-holding key 34 and is operable to cover the bore 46 to preclude entry of foreign debris within the bore.

When positioned within the center opening 42, the fuse F engages a plurality of contacts 50 which are arranged in pairs to affect electrical communication between the ends of the fuse and the first and second halves 36, 38 of the key 34. This arrangement allows electrical power to be transmitted from the first half 36 through the fuse F to the second half 38 of the fuse-holding key 34.

In the second embodiment 30, the tumbler 52 of the unillustrated ignition switch of the vehicle 18 is provided with a pair of spring loaded contacts 54, 56 which are each connected to respective wires 58, 60 of the disabling circuit 12. By this structure, the vehicle disabling system 10 is provided with the additional feature of rendering the vehicle 18 inoperative to a person who actuates the tumbler 52 through unauthorized means such as picking, drilling, and the like. Furthermore, the fuse-holding key 34 provides a discrete and easily accessible mounting arrangement for the fuse F.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A timed vehicle disabling system connectable in series between a vehicle battery and a vehicle ignition system, said disabling system comprising:
   a fuse positioned in series between said vehicle battery and said ignition system, said fuse having sides;
   a switch electrically connected to one of said sides of said fuse opposite said vehicle battery;
   a relay for selectively closing said switch;
   a timing means for energizing said relay after a predetermined length of time;
   and,
   a panic switch electrically connected to said timing means for actuating said timing means, whereby said timing means will energize said relay after a pre-determined length of time to close said switch, thereby blowing said fuse and interrupting a supply of power from the vehicle battery to said vehicle ignition system.

2. The timed vehicle disabling system of claim 1, and further comprising a pair of diodes, said diodes being positioned in series with said vehicle ignition system, whereby one diode allows a one-way current flow from said vehicle battery to said fuse, and said other diode allows a one-way current flow from said fuse to said vehicle ignition system.

3. The timed vehicle disabling system of claim 2, and further comprising a key-contained fuse holder including a fuse-holding key having a first half and a second half with an insulator extending longitudinally therebetween and shaped so as to define a center opening with a first pair of contacts formed on said first half and a second pair of contacts formed on said second half, said first half having a bore through which said fuse may be positioned within said center opening to engage said first and second pairs of contacts to effect electrical communication between said first half and said second half of said key; and, a tumbler operable to receive said key, said tumbler having a first spring loaded contact operable to engage said first half of said key and a second spring loaded contact operable to engage second half of said key, whereby said first and second spring loaded contacts may be wired in series between said vehicle battery and said vehicle ignition system.

4. The timed vehicle disabling system of claim 3, and further comprising a side cover pivotally mounted to said fuse-holding key for covering said bore.

5. The timed vehicle disabling system of claim 4, and further comprising a case in which said timing means, said relay, said switch, and said panic switch are mounted.

6. The timed vehicle disabling system of claim 5, wherein said case has a mounting flange extending circumferentially therearound.

* * * * *